US012244091B2

(12) United States Patent
Farrell et al.

(10) Patent No.: US 12,244,091 B2
(45) Date of Patent: Mar. 4, 2025

(54) ELECTRICAL CONNECTOR HAVING A SEAL WITH A SECONDARY TERMINAL LOCKING MECHANISM

(71) Applicant: Aptiv Technologies AG, Schaffhausen (CH)

(72) Inventors: Jack Farrell, Streetsboro, OH (US); Matthew L. Penn, Cortland, OH (US)

(73) Assignee: Aptiv Technologies AG, Schaffhausen (CH)

( * ) Notice: Subject to any disclaimer, the term of this patent is extended or adjusted under 35 U.S.C. 154(b) by 377 days.

(21) Appl. No.: 17/840,160

(22) Filed: Jun. 14, 2022

(65) Prior Publication Data

US 2023/0402787 A1 Dec. 14, 2023

(51) Int. Cl.

| | |
|---|---|
| ***H01R 13/52*** | (2006.01) |
| ***H01R 43/00*** | (2006.01) |
| ***H01R 43/18*** | (2006.01) |

(52) U.S. Cl.

CPC ....... *H01R 13/5205* (2013.01); *H01R 43/005* (2013.01); *H01R 43/18* (2013.01)

(58) Field of Classification Search

None

See application file for complete search history.

(56) References Cited

U.S. PATENT DOCUMENTS

| | | | | |
|---|---|---|---|---|
| 4,735,581 A | | 4/1988 | Endo et al. | |
| 4,895,533 A | * | 1/1990 | Yagi | H01R 13/5205 439/587 |
| 8,393,911 B2 | * | 3/2013 | Aoki | H01R 13/5205 439/272 |
| 10,148,032 B1 | | 12/2018 | Brantingham et al. | |
| 2006/0019535 A1 | | 1/2006 | Fukushima et al. | |
| 2011/0111627 A1 | * | 5/2011 | Sawamura | H01R 13/5208 439/587 |
| 2014/0008122 A1 | | 1/2014 | Imahori et al. | |

(Continued)

FOREIGN PATENT DOCUMENTS

| | | |
|---|---|---|
| JP | H04284383 A | 10/1992 |
| JP | H09147965 A | 6/1997 |

OTHER PUBLICATIONS

"Extended European Search Report"; European Patent Office; issued Feb. 27, 2024; 13 Pages.

(Continued)

*Primary Examiner* — Oscar C Jimenez

(74) *Attorney, Agent, or Firm* — Billion & Armitage

(57) ABSTRACT

An electrical connector includes an electrical terminal, a terminal module in which the electrical terminal is disposed, a connector housing having a primary locking mechanism configured to secure the terminal module within the connector housing, a secondary locking mechanism also configured to secure the terminal module within the connector housing, and a retainer attached to the connector housing and configured to maintain compressive contact between the secondary locking mechanism and the terminal module. The secondary locking mechanism further includes a wire seal assembly that has a rigid tube, a compliant tubular inner seal axially disposed within the rigid tube, and a compliant tubular outer seal axially surrounding the rigid tube.

15 Claims, 7 Drawing Sheets

(56) References Cited

U.S. PATENT DOCUMENTS

| | | | | |
|---|---|---|---|---|
| 2015/0136471 | A1* | 5/2015 | Muehlmichel ....... | H02G 15/013 174/652 |
| 2015/0372469 | A1* | 12/2015 | Natter .................... | H02G 3/088 174/659 |
| 2018/0351286 | A1 | 12/2018 | Brantingham et al. | |
| 2018/0366864 | A1* | 12/2018 | Motohashi ......... | H01R 13/5208 |
| 2020/0080644 | A1* | 3/2020 | Hartmann-Bax .... | A61N 1/3752 |
| 2021/0057845 | A1 | 2/2021 | Minamino | |

OTHER PUBLICATIONS

"9.5 YPT WP Connector Single Wire Seal", Yazaki Corporation, Part No. Ch. Code 7158-3672-50 ETC, DWG No. 7158-3672-50 ETC.

* cited by examiner

ELECTRICAL CONNECTOR HAVING A SEAL WITH A SECONDARY TERMINAL LOCKING MECHANISM

TECHNICAL FIELD

This disclosure is generally directed to sealed electrical connectors and more particularly to an electrical connector having a wire seal that provides a secondary terminal locking mechanism.

BACKGROUND

In many applications, it is necessary to mount electrical cables to terminals or connector housings and to seal the connection against environmental contaminants, such as moisture, dust, etc. To this end so-called single wire seals are known in the art, which are arranged onto the cable sheath and which provide a seal between the cable and inner walls of the terminal or the connector housing.

A typical prior art document dealing with elastic single wire seals is U.S. Pat. No. 4,895,533. This document discloses a waterproof plug for a connector. The waterproof plug comprises a rubber plug having an outer tube portion capable of fitting to an inner wall of a connector housing, a stabilizing tube having rigidity mounted next to the outer tube portion of said rubber plug, and an electric wire inserting hole in the central portion thereof. Another prior art document dealing with elastic single wire seals is German Patent No. DE 19 828 482 A1 disclosing a single wire seal for sealing a gap between a conductor and a connector housing. A reinforcement region is joined to a sealing region of a sealing body. Further, reinforcement ribs are connected on a first side to a hollow cylindrical base of the reinforcement region, and on an adjacent second side to a sealing lip.

Lateral compression of the seal is necessary for forming a seal between the wire cable and the connector housing. However, such a cable seal can also be longitudinally compressed causing unwanted movement of the terminal in the connector housing that can cause intermittent electrical disconnection and/or fretting corrosion of the terminal. Therefore, a cable seal that reduces or eliminates longitudinal compression while still allowing lateral compression remains desired.

FIG. 1 shows an example of an existing electrical connector 10 that is engaged with a mating electrical connector 110. The electrical connector 10 of FIG. 1 has a compliant wire seal 12 that is configured to surround a wire (not shown) attached to a terminal 14 disposed within a terminal module 16 in the connector's housing 18. The terminal module 16 is retained within the housing 18 by a primary locking mechanism 20 in the form of a cantilevered arm that extends from the housing 18 and engages the terminal module 16. The wire seal 12 is disposed between the terminal module 16 and a wire seal retainer 22. The wire seal 12 provides a secondary locking mechanism that inhibits the terminal module 16 from being forced from the connector housing 18 in the event of a failure of the primary locking mechanism 20. However, because the wire seal 12 is made from a compliant material in order to seal against the walls of the housing 18 and the wire, the terminal module 16 may still be subject to longitudinal motion due to longitudinal compression of the wire seal 12 when a force is applied to the terminal 14 or the wire.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY

According to one or more aspects of the present disclosure, a wire seal assembly includes a rigid tube, a compliant tubular inner seal axially disposed within the rigid tube, and a compliant tubular outer seal axially surrounding the rigid tube.

In one or more embodiments of the wire seal assembly according to the previous paragraph, the rigid tube extends beyond ends of the inner seal and the outer seal.

In one or more embodiments of the wire seal assembly according to any one of the previous paragraphs, the rigid tube is flush with ends of the inner seal and the outer seal.

In one or more embodiments of the wire seal assembly according to any one of the previous paragraphs, the rigid tube is formed from a material selected from a list consisting of polyamide, polybutylene terephthalate, and acrylonitrile butadiene styrene, with or without glass filling.

In one or more embodiments of the wire seal assembly according to any one of the previous paragraphs, the rigid tube is formed from a polymeric material having a Shore A hardness greater than 75.

In one or more embodiments of the wire seal assembly according to any one of the previous paragraphs, the inner seal and the outer seal are formed from a silicone rubber material.

In one or more embodiments of the wire seal assembly according to any one of the previous paragraphs, the inner seal and the outer seal are formed from a compliant polymeric material having a Shore A hardness in a range of 35 to 45.

In one or more embodiments of the wire seal assembly according to any one of the previous paragraphs, a material forming the rigid tube has a Shore A harness at least 20 points higher than a material forming the inner seal and the outer seal.

In one or more embodiments of the wire seal assembly according to any one of the previous paragraphs, the rigid tube, the inner seal, and the outer seal each have a generally cylindrical shape.

According to one or more aspects of the present disclosure, an electrical connector includes an electrical terminal, a terminal module in which the electrical terminal is disposed, a connector housing having a primary locking mechanism configured to secure the terminal module within the connector housing, a secondary locking mechanism also configured to secure the terminal module within the connector housing, and a retainer attached to the connector housing and configured to maintain compressive contact between the secondary locking mechanism and the terminal module. The secondary locking mechanism further includes the wire seal assembly according to any one of the previous paragraphs.

According to one or more aspects of the present disclosure, a method of manufacturing a wire seal assembly includes the steps of injecting a polymeric material having a shore A hardness of at least 75 when cured into a mold to form a rigid tube, injecting a compliant polymeric material having a shore A hardness in a range of 35 to 45 when cured into a mold to form a tubular inner seal within the rigid tube, and injecting the compliant polymeric material into a mold to form a tubular outer seal around the rigid tube.

In one or more embodiments of the method according to the previous paragraph, the rigid tube extends beyond ends of the inner seal and the outer seal.

In one or more embodiments of the method according to any one of the previous paragraphs, the rigid tube is flush with ends of the inner seal and the outer seal.

In one or more embodiments of the method according to any one of the previous paragraphs, the polymeric material is selected from a list consisting of polyamide, polybutylene terephthalate, and acrylonitrile butadiene styrene, with or without glass filling.

In one or more embodiments of the method according to any one of the previous paragraphs, the compliant polymeric material is a silicone rubber material.

According to one or more aspects of the present disclosure, an electrical connector is manufactured by a process includes the steps of providing an electrical terminal attached to a wire, inserting the electrical terminal within a terminal module, securing the terminal module within a connector housing a connector housing via a primary locking mechanism, inserting the wire within a wire seal assembly such that an inner seal of the wire seal assembly is sealingly engaged with the wire, inserting the wire seal assembly within the connector housing such that an outer seal of the wire seal assembly is sealingly engaged with the connector housing and an end of a rigid tube in the wire seal assembly is in contact with the terminal module, and attaching a wire seal retainer to the connector housing such that another end of the rigid tube is in contact with the wire seal retainer, wherein the wire seal retainer is configured to maintain compressive contact between the wire seal assembly and the terminal module, thereby providing a secondary locking mechanism for the terminal module.

In one or more embodiments of the electrical connector according to the previous paragraph, the wire seal assembly is formed by injecting a polymeric material having a shore A hardness of at least 75 when cured into a mold to form a rigid tube, injecting a compliant polymeric material having a shore A hardness in a range of 35 to 45 when cured into a mold to form a tubular inner seal within the rigid tube, and injecting the compliant polymeric material into a mold to form a tubular outer seal around the rigid tube.

In one or more embodiments of the electrical connector according to any one of the previous paragraphs, the polymeric material is selected from a list consisting of polyamide, polybutylene terephthalate, and acrylonitrile butadiene styrene, with or without glass filling and the compliant polymeric material is a silicone rubber material.

In one or more embodiments of the electrical connector according to any one of the previous paragraphs, the rigid tube extends beyond ends of the inner seal and the outer seal.

In one or more embodiments of the electrical connector according to any one of the previous paragraphs, the rigid tube is flush with ends of the inner seal and the outer seal.

BRIEF DESCRIPTION OF THE DRAWINGS

The present invention will now be described, by way of example with reference to the accompanying drawings, in which.

DETAILED DESCRIPTION

This patent application is directed to a sealed electrical connector having primary and secondary locking mechanisms to retain a terminal module within a housing.

Figure 1:
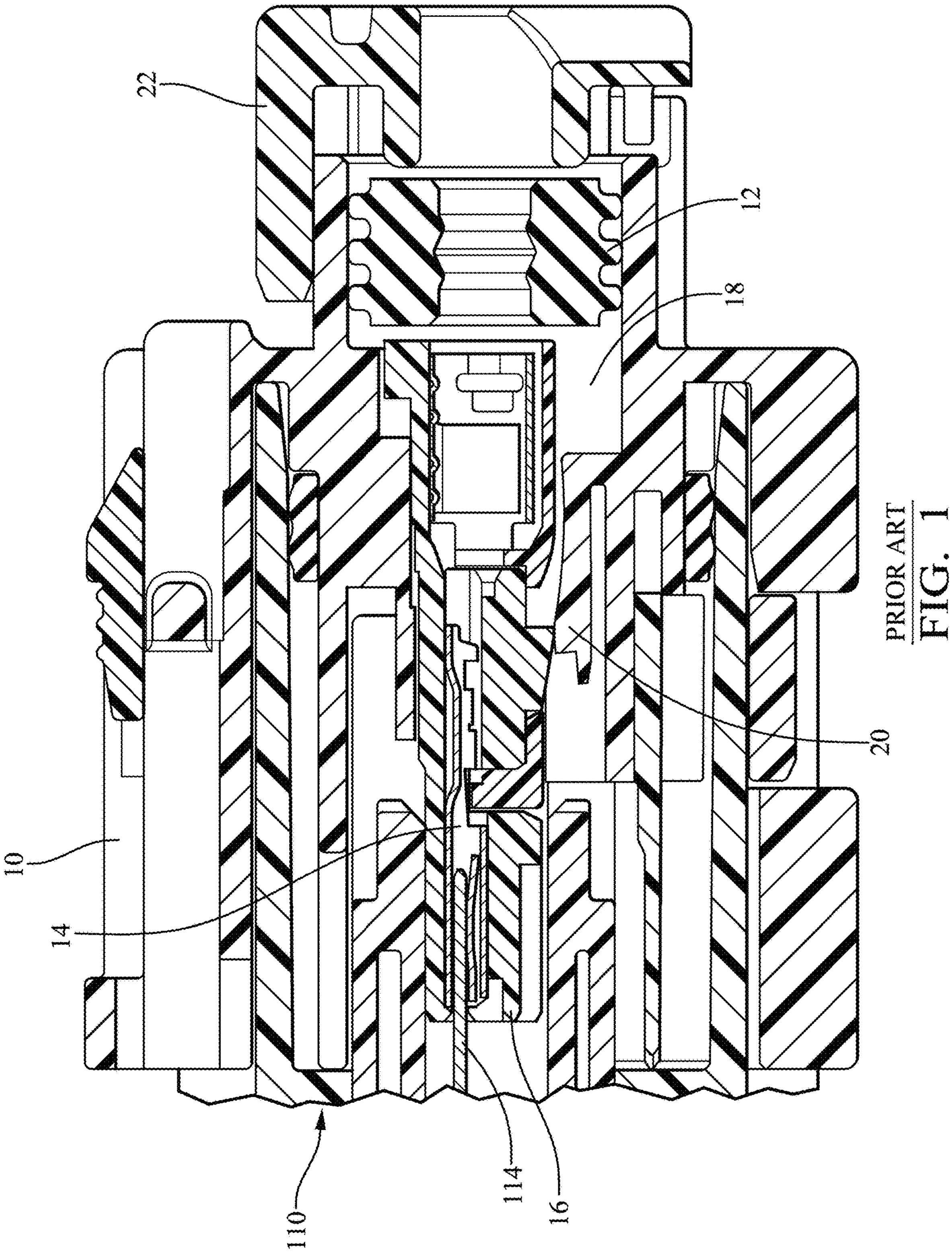
PRIOR ART FIG. 1
FIG. 1 illustrates a cross-section view of an electrical connector according to the prior art.
Figure 2:
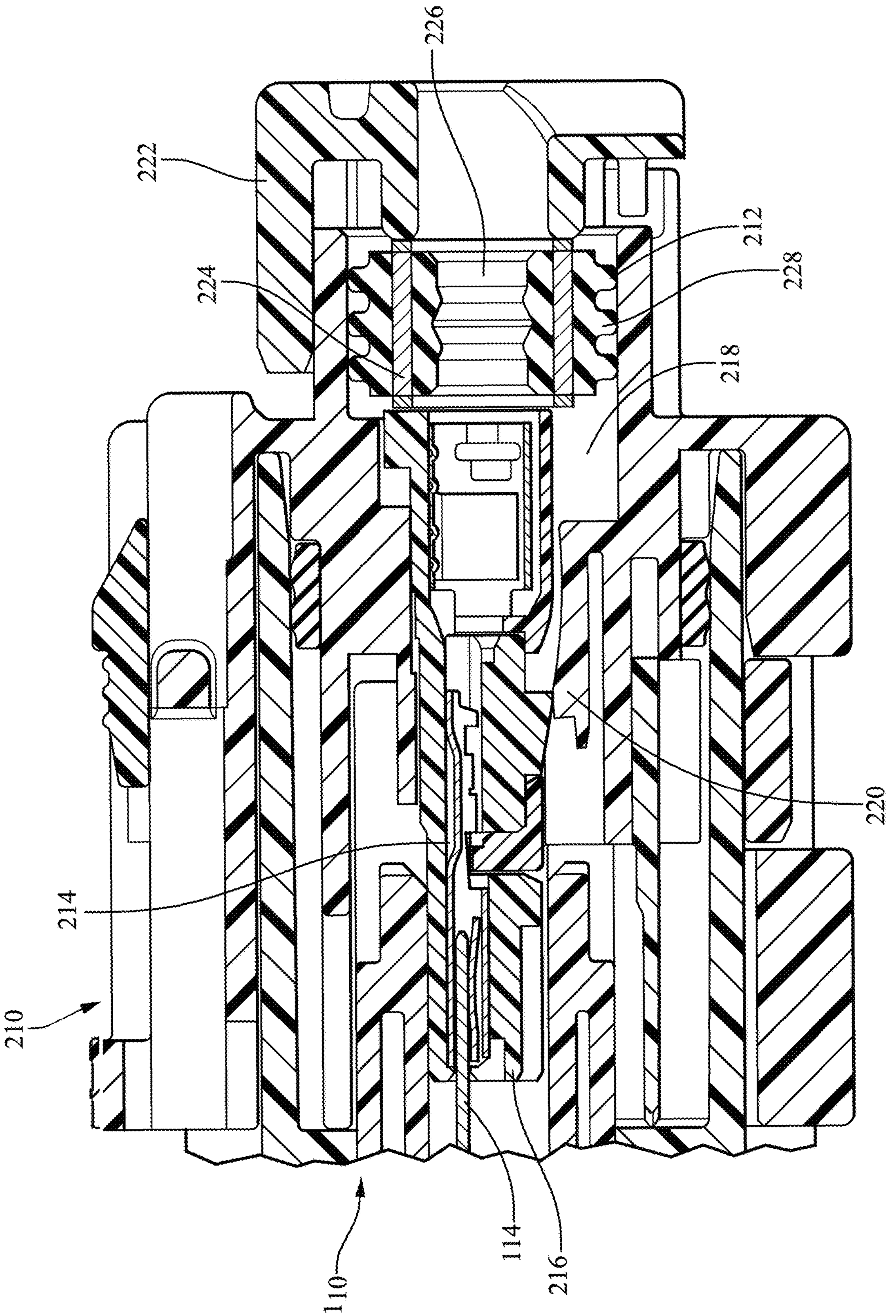
FIG. 2 illustrates a cross-section view of an electrical connector according to some embodiments.
Figure 3:
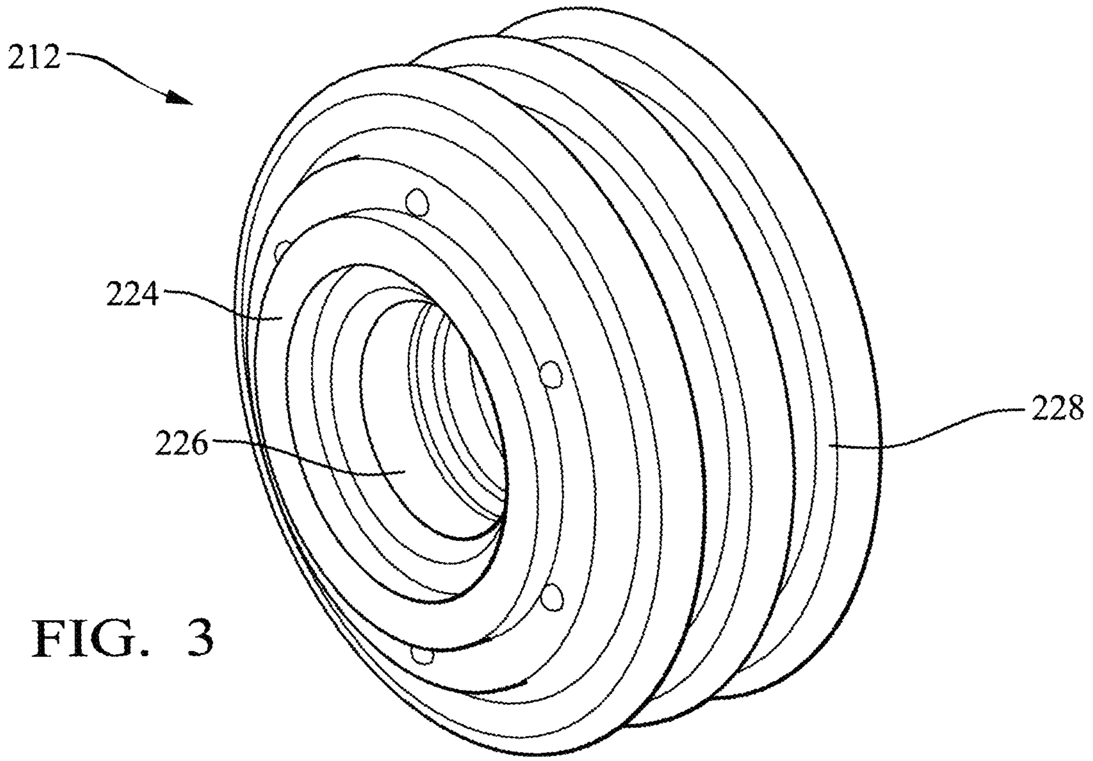
FIG. 3 illustrates a perspective view of a wire seal assembly of the electrical connector of FIG. 2 according to some embodiments.
Figure 4:
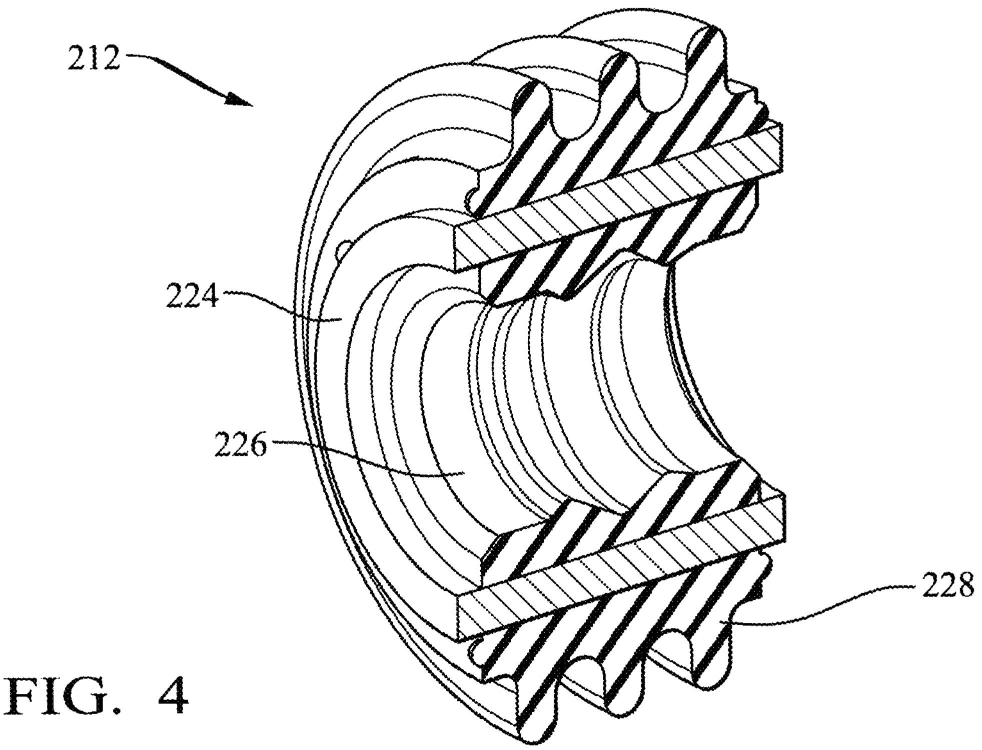
FIG. 4 illustrates a cross-section view of the wire seal assembly of FIG. 3 according to some embodiments.

The electrical connector 210 shown in FIG. 2 has basically the same configuration as the electrical connector 10 discussed in the BACKGROUND section and shown in FIG. 1. However, the construction and function of the wire seal assembly 212 is different. The wire seal assembly 212 of the electrical connector 210 is an assembly that includes a cylindrical rigid tube 224 having a cylindrical inner seal 226 inside the rigid tube 224 as shown in FIGS. 3 and 4. As used herein, the term "rigid" means that the material forming the rigid tube 224 has a Shore A hardness that is greater than or equal to 75. The inner seal 226 is configured to seal a wire attached to the terminal 214. The wire seal assembly 212 also includes a cylindrical outer seal 228 located on the outside of the rigid tube 224 that is configured to seal the tube 224 to the connector housing 218. The rigid tube 224 is disposed between the terminal module 216 and the wire seal retainer 222 and is held in compressive contact between them. The rigid tube 224 inhibits the terminal module 216 from being forced from the connector housing 218 in the event of a failure of the primary locking mechanism 220 and the rigidity also inhibits longitudinal motion of the terminal module 216 if a longitudinal force is applied to the terminal 214, the terminal module 216, or the wire attached to the terminal 214. The wire seal assembly 212 also provides better mechanical performance of the secondary locking mechanism by both increasing the force necessary to defeat the secondary lock and reducing the distance the terminal module 216 can travel before the secondary lock is engaged.

Figure 5B:
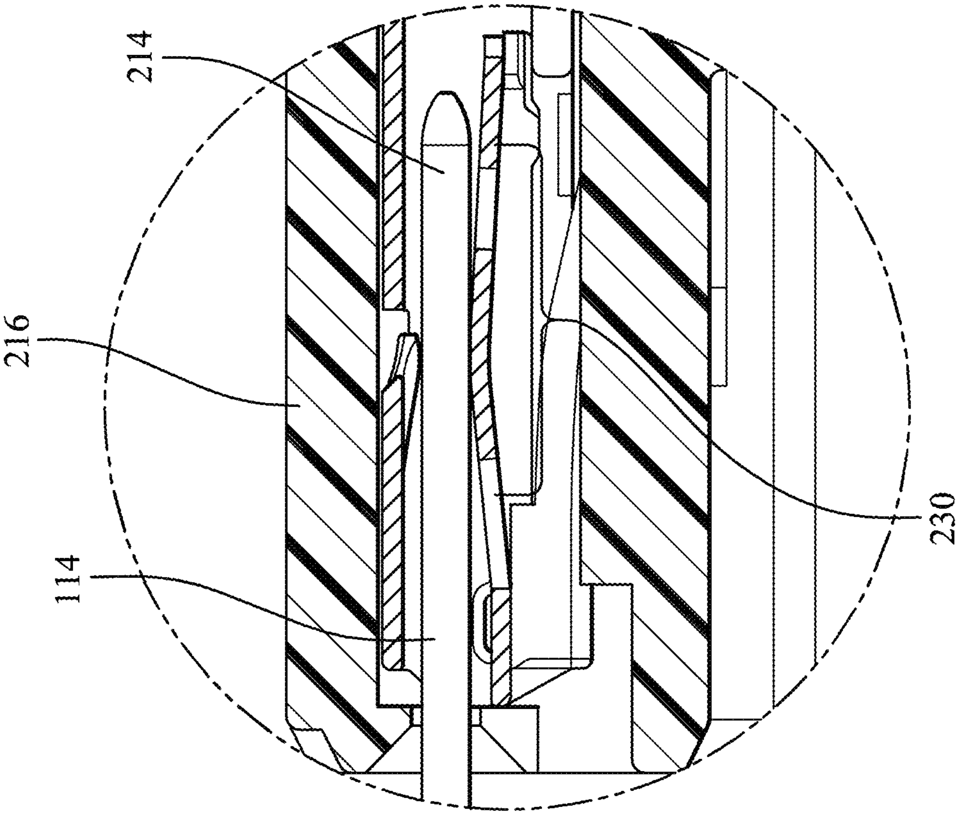
FIG. 5B illustrates a close-up cross section view of a terminal of the electrical connector of FIG. 2 according to some embodiments.
Figure 5A:
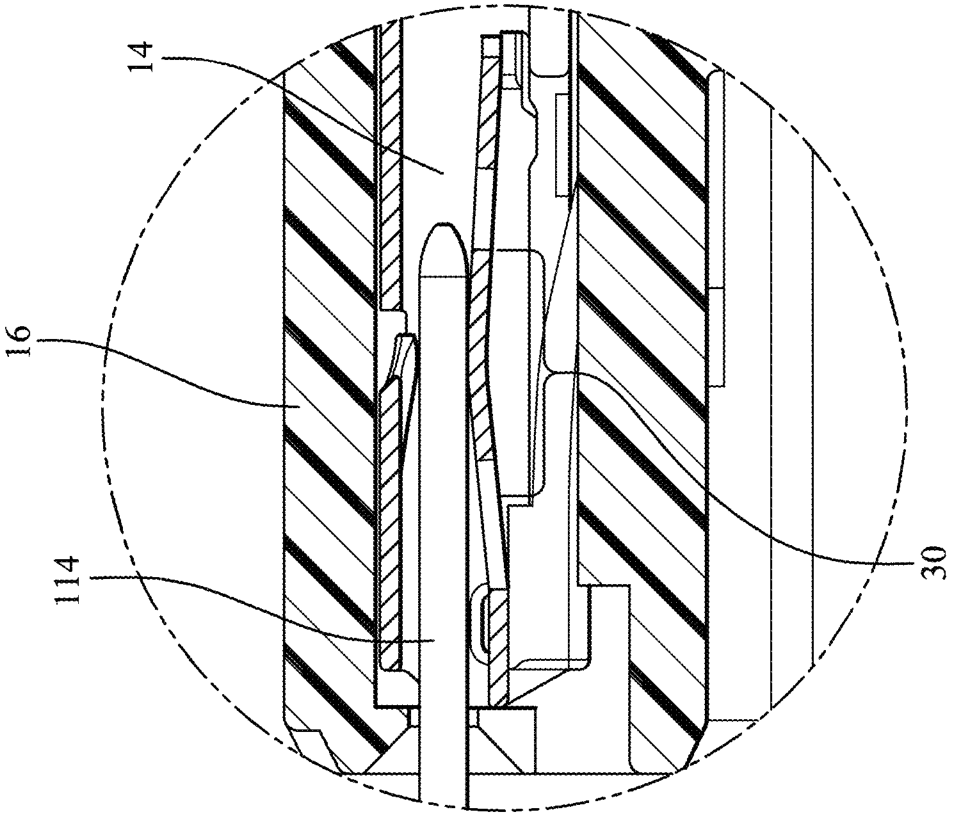
PRIOR ART FIG. 5A
FIG. 5A illustrates close-up cross section view of a terminal of the electrical connector of FIG. 1 according to the prior art.

The wire seal assembly 212 ensures a more robust connection between the terminal 214 in the electrical connector 210 and the mating terminal 114 in the mating connector 110. In the event that the primary locking mechanism 220 is damaged or otherwise defeated, the wire seal assembly 212 does not longitudinally compress against the wire seal retainer 222, thereby maintaining the terminal overlap 230 between the terminal 214 in the electrical connector 210 and the mating terminal 114 in the mating connector 110, as shown in FIG. 5B. In comparison, in the event that the primary locking mechanism 20 is damaged or otherwise defeated, the wire seal assembly 12 may be longitudinally compressed against the retainer 22 such that the terminal overlap 30 between the terminal 14 in the electrical connector 10 and the mating terminal 114 in the mating connector 110, as shown in FIG. 5A, is less than the terminal overlap 230.

Figure 6:
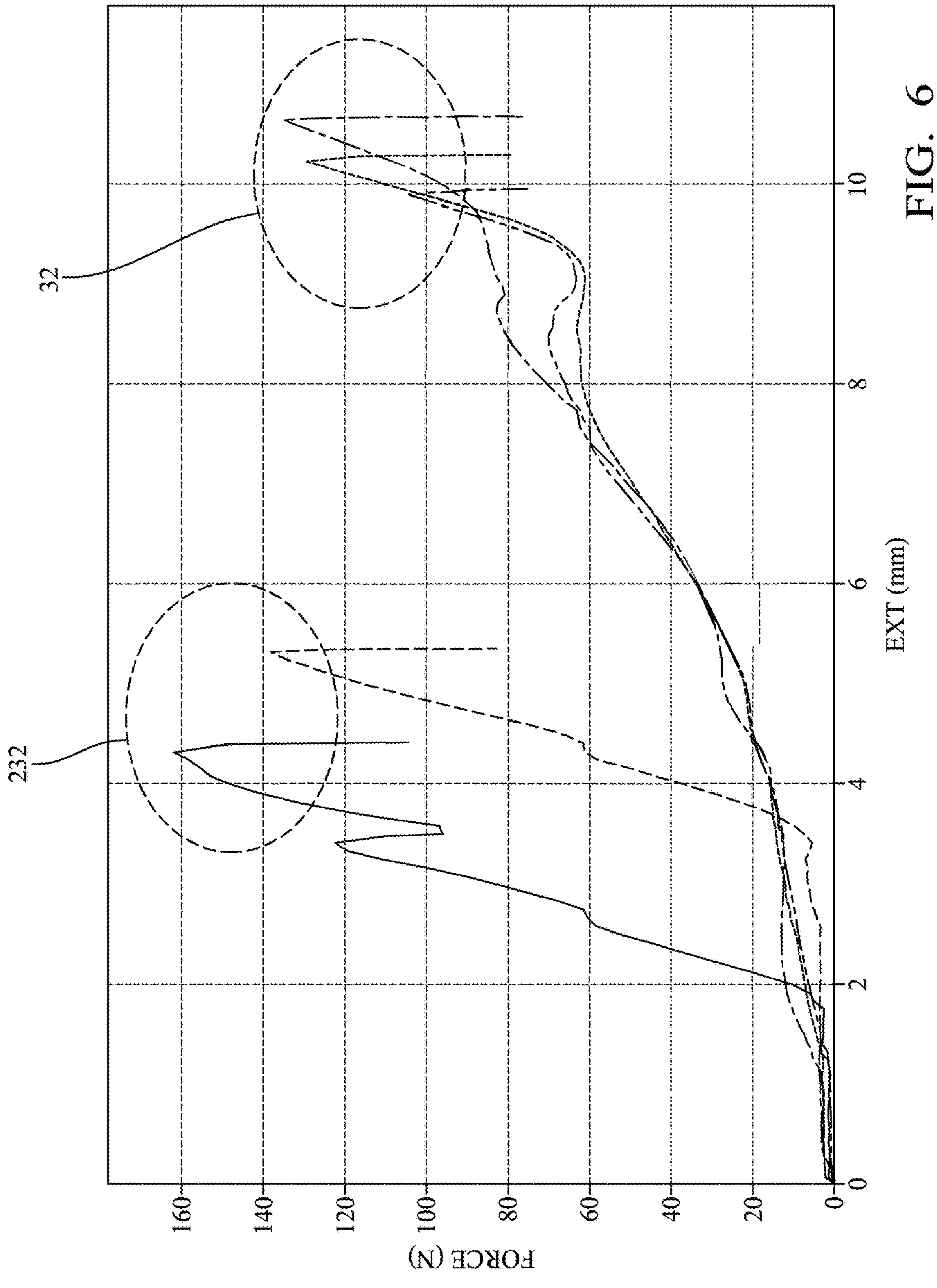
FIG. 6 illustrates a graph comparing terminal pull out forces of the electrical connector of FIG. 1 to the electrical connector of FIG. 2.

As shown in FIG. 6, a displacement force 232 required to dislodge the terminal module 216 from the connector housing 218 after the primary locking mechanism 220 of the connector 210 has failed is greater than a displacement force 32 required to dislodge the terminal module 16 from the connector housing 18 after the primary locking mechanism 20 of the connector 10 has failed. FIG. 6 also shows that the displacement force 232 of the terminal module 216 of the connector 210 prior to reaching the dislodging force level is less than the displacement force 32 of the terminal module 16 of the connector 10.

The rigid tube 224 may extend beyond the ends of the inner seal 226 and the outer seal 228 or may be flush with the ends of inner seal 226 and the outer seal 228. In another embodiment, the rigid tube 224 may extend beyond one end of the inner seal 226 and the outer seal 228 and may be flush with the other end of the inner seal 226 and the outer seal 228. The rigid tube 224 of the wire seal assembly 212 provides the benefit of more uniform contact with the terminal module 216 compared with the seal of U.S. Pat. No. 10,148,032. In addition, the wire seal assembly 212 beneficially provides more uniform sealing between the seal and the cable and the seal and the connector due to the uniform thickness of compliant material in the inner seal 226 and the outer seal 228 that is not present in the previous design. As used herein, the term "compliant" means that the material has a Shore A hardness less than or equal to 45. Further, the rigid tube 224 is more easily co-molded with the inner seal 226 and the outer seal 228 than the seal and separate posts of U.S. Pat. No. 10,148,032.

The rigid tube 224 may be formed from a material selected from an engineered polymer, such as polyamide (NYLON), polybutylene terephthalate (PBT), or acrylonitrile butadiene styrene (ABS) plastic. The plastic material may or may not include glass filling. The material forming the rigid tube 224 has a Shore A hardness greater than 75.

The inner seal 226 and the outer seal 228 may be formed from a silicone rubber material having a Shore A hardness in a range of 35 to 45, preferably 40. The material forming the rigid tube 224 preferably has a Shore A hardness at least 20 points higher than the material forming the inner seal 226 and the outer seal 228.

The wire seal assembly 212 may be manufactured using co-molding techniques to form the rigid tube 224, the inner seal 226, and the outer seal 228.

Figure 7:
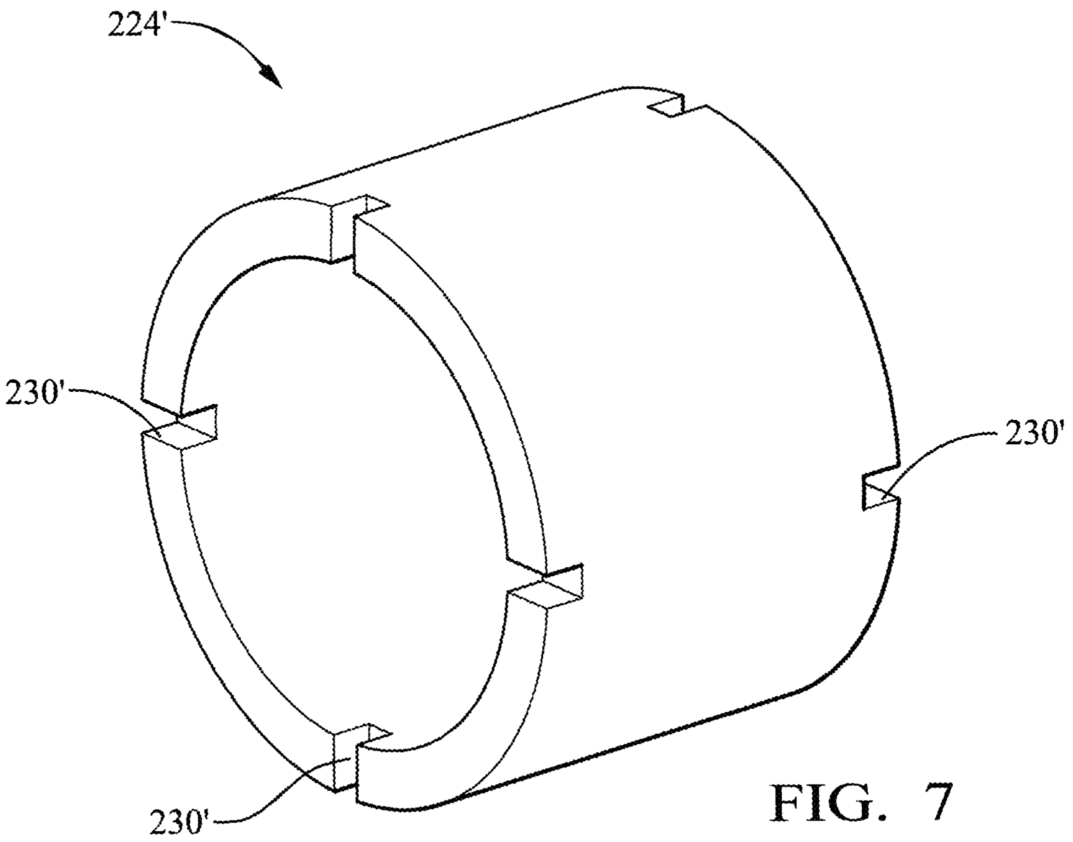
FIG. 7 illustrates a perspective view of a rigid tube of a wire seal assembly according to some embodiments.
Figure 8:
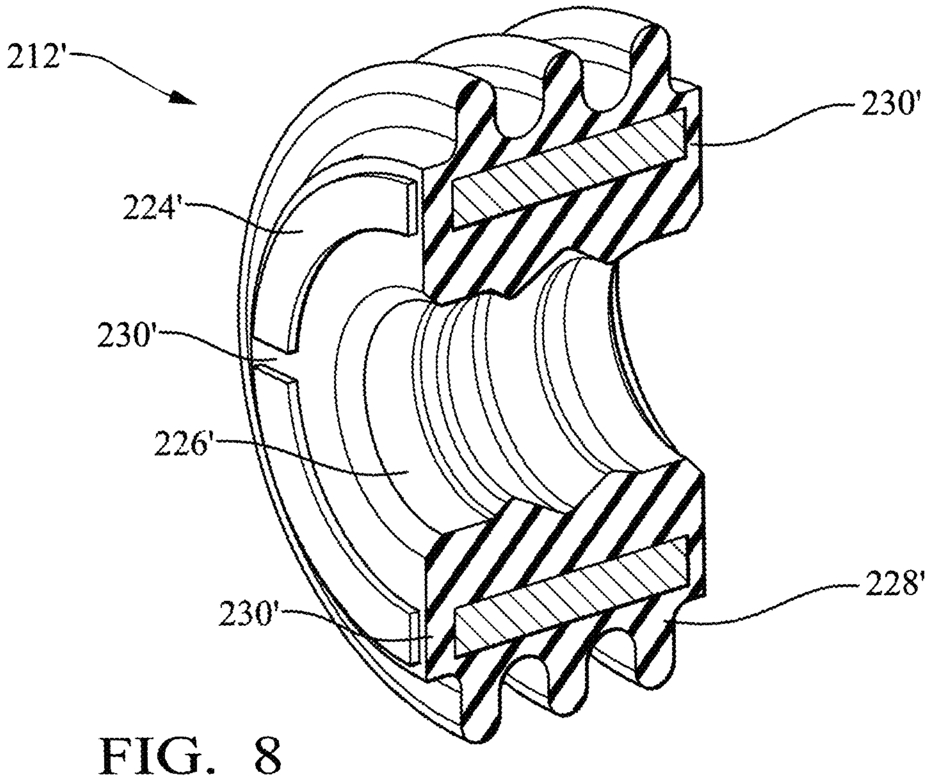
FIG. 8 illustrates a cross-section view of a wire seal assembly according to some embodiments.

In an alternative embodiment of the wire seal assembly 212' shown in FIGS. 7 and 8, the inner seal 226' and the outer seal 228' may be integrally formed by defining a plurality of notches 230' or other apertures in the rigid tube 224' so that the compliant material may flow from the outside of the rigid tube 224' to the inside of the rigid tube 224' or vice versa, when the compliant material forming the inner seal 226' and the outer seal 228' is co-molded with the rigid tube 224'. In the illustrated example, the notches 230' are defined in the ends of the rigid tube 224' and are spaced about 90 degrees apart.

Figure 9:
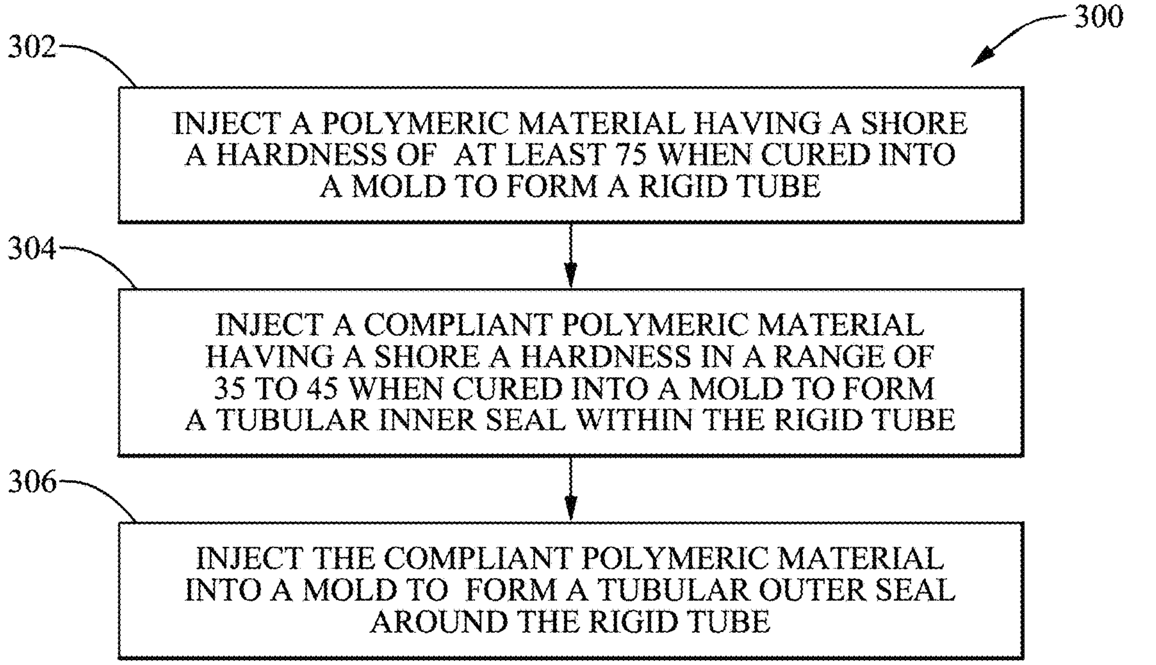
FIG. 9 illustrates a flow chart of a method of manufacturing a wire seal assembly according to some embodiments.

A method 300 of manufacturing a wire seal assembly 212 is illustrated in FIG. 9. The method 300 includes the following steps:

STEP 302, INJECT A POLYMERIC MATERIAL HAVING A SHORE A HARDNESS OF AT LEAST 75 WHEN CURED INTO A MOLD TO FORM A RIGID TUBE, includes injecting a polymeric material having a shore A hardness of at least 75 when cured into a mold to form a rigid tube 224;

STEP 304, INJECT A COMPLIANT POLYMERIC MATERIAL HAVING A SHORE A HARDNESS IN A RANGE OF 35 TO 45 WHEN CURED INTO A MOLD TO FORM A TUBULAR INNER SEAL WITHIN THE RIGID TUBE, includes injecting a compliant polymeric material having a shore A hardness in a range of 35 to 45 when cured into a mold to form a tubular inner seal 226 within the rigid tube 224; and STEP 306, INJECT THE COMPLIANT POLYMERIC MATERIAL INTO A MOLD TO FORM A TUBULAR OUTER SEAL AROUND THE RIGID TUBE, includes injecting the compliant polymeric material into a mold to form a tubular outer seal 228 around the rigid tube 224.

The rigid tube 224 may extend beyond the ends of the inner seal 226 and the outer seal 228 or may be flush with the ends of the inner seal 226 and the outer seal 228. In another embodiment, the rigid tube 224 may extend beyond one end of the inner seal 226 and the outer seal 228 and may be flush with the other end of the inner seal 226 and the outer seal 228.

The polymeric material used to form the rigid tube 224 may be an engineered polymer such as polyamide (PA, NYLON), polybutylene terephthalate (PBT), and acrylonitrile butadiene styrene (ABS). The polymeric material used to form the rigid tube 224 may or may not be glass fiber filled. The compliant polymeric material used to form the inner and outer seals 226, 228 may be a silicone rubber material.

Figure 10:
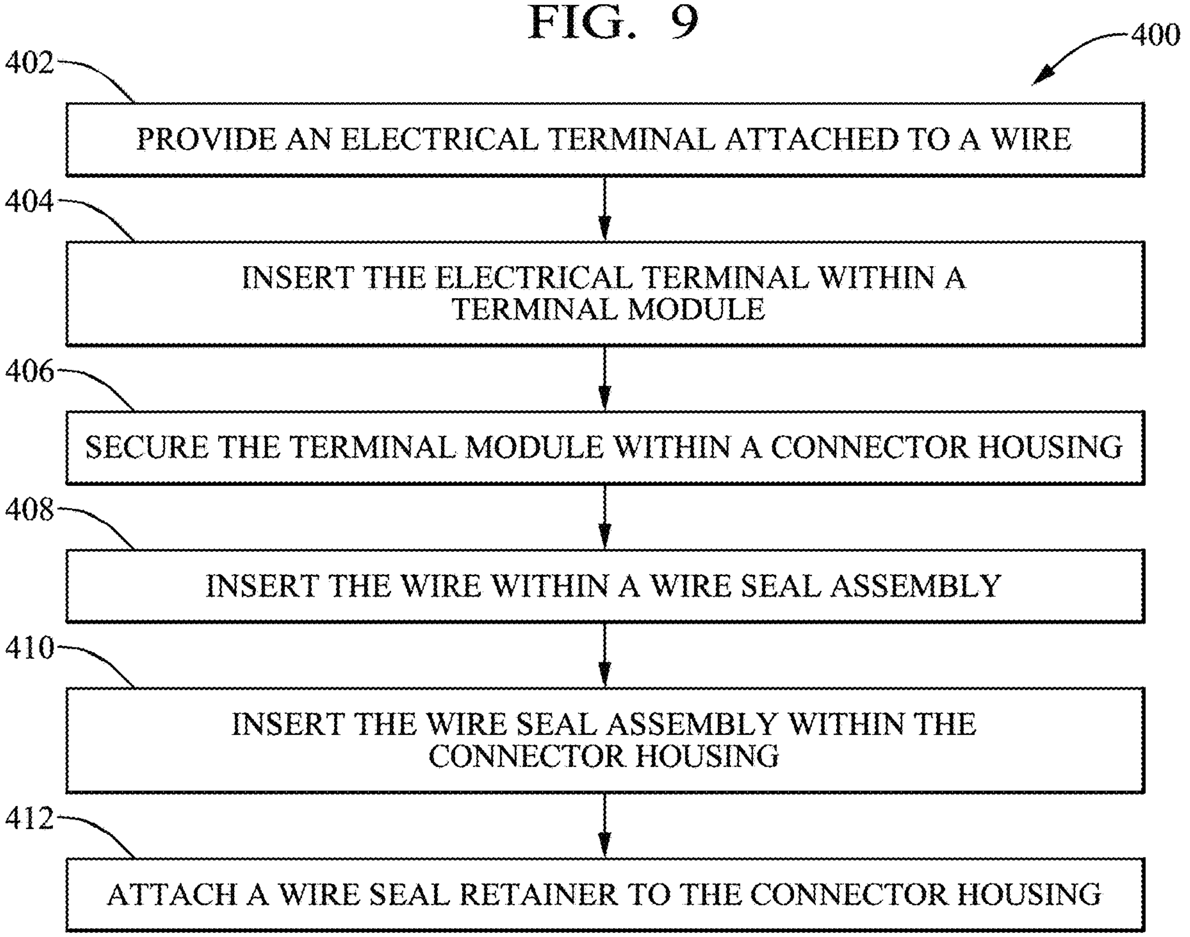
FIG. 10 illustrates a flow chart of a process of forming an electrical connector according to some embodiments.

A process 400 of manufacturing an electrical connector 210 is illustrated in FIG. 10. The process 400 includes the following steps:

STEP 402, PROVIDE AN ELECTRICAL TERMINAL ATTACHED TO A WIRE, includes providing an electrical terminal 214 attached to a wire;

STEP 404, INSERT THE ELECTRICAL TERMINAL WITHIN A TERMINAL MODULE, includes inserting the electrical terminal 214 within a terminal module 216;

STEP 406, SECURE THE TERMINAL MODULE WITHIN A CONNECTOR HOUSING, includes securing the terminal module 216 within a connector housing 218 via a primary locking mechanism 220;

STEP 408, INSERT THE WIRE WITHIN A WIRE SEAL ASSEMBLY, includes inserting the wire within a wire seal assembly 212 such that an inner seal 226 of the wire seal assembly 212 is sealingly engaged with the wire;

STEP 410, INSERT THE WIRE SEAL ASSEMBLY WITHIN THE CONNECTOR HOUSING, includes inserting the wire seal assembly 212 within the connector housing 218 such that an outer seal 228 of the wire seal assembly 212 is sealingly engaged with the connector housing 218 and an end of a rigid tube 224 in the wire seal assembly 212 is in contact with the terminal module 216; and STEP 412, ATTACH A WIRE SEAL RETAINER TO THE CONNECTOR HOUSING, includes attaching a wire seal retainer 222 to the connector housing 218 such that another end of the rigid tube 224 is in contact with the wire seal retainer 222. The wire seal retainer 222 is configured to maintain compressive contact between the wire seal assembly 212 and the terminal module 216, thereby providing a secondary locking mechanism for the terminal module 216.

The wire seal assembly 212 may be formed by the method 300 described above.

The polymeric material used to form the rigid tube 224 may be an engineered polymer such as polyamide (PA, NYLON), polybutylene terephthalate (PBT), and acrylonitrile butadiene styrene (ABS). The polymeric material used to form the rigid tube 224 may or may not be glass fiber filled. The compliant polymeric material used to form the inner and outer seals 226, 228 may be a silicone rubber material.

The rigid tube 224 may extend beyond the ends of the inner seal 226 and the outer seal 228 or may be flush with the ends of the inner seal 226 and the outer seal 228. In another embodiment, the rigid tube 224 may extend beyond one end of the inner seal 226 and the outer seal 228 and may be flush with the other end of the inner seal 226 and the outer seal 228.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A wire seal assembly configured to retain a terminal module within a connector housing of an electrical connector, comprising:
- a rigid tube;
- a compliant tubular inner seal axially disposed within the rigid tube; and
- a compliant tubular outer seal separate from the inner seal and axially surrounding the rigid tube, the rigid tube extending axially from one end of the inner seal to another end of the inner seal and extending axially from one end of the outer seal to another end of the outer seal.

2. The wire seal assembly in accordance with claim 1, wherein the rigid tube extends beyond the ends of the inner seal and the outer seal.

3. The wire seal assembly in accordance with claim 1, wherein the rigid tube is flush with the ends of the inner seal and the outer seal.

4. The wire seal assembly in accordance with claim 1, wherein the rigid tube comprises a material selected from a list consisting of polyamide, polybutylene terephthalate, and acrylonitrile butadiene styrene, with or without glass filling.

5. The wire seal assembly in accordance with claim 1, wherein the rigid tube comprises a polymeric material having a Shore A hardness greater than 75.

6. The wire seal assembly in accordance with claim 1, wherein the inner seal and the outer seal comprise a silicone rubber material.

7. The wire seal assembly in accordance with claim 1, wherein the inner seal and the outer seal comprise a compliant polymeric material having a Shore A hardness in a range of 35 to 45.

8. The wire seal assembly in accordance with claim 1, wherein a material forming the rigid tube has a Shore A harness at least 20 points higher than a material forming the inner seal and the outer seal.

9. The wire seal assembly in accordance with claim 1, wherein the rigid tube, the inner seal, and the outer seal each have a generally cylindrical shape.

10. An electrical connector, comprising:
- an electrical terminal;
- a terminal module in which the electrical terminal is disposed;
- a connector housing having a primary locking mechanism configured to secure the terminal module within the connector housing;
- a secondary locking mechanism also configured to secure the terminal module within the connector housing; and
- a retainer attached to the connector housing and configured to maintain compressive contact between the secondary locking mechanism and the terminal module, wherein the secondary locking mechanism comprises the wire seal assembly in accordance with claim 1.

11. A method of manufacturing a wire seal assembly, comprising:

injecting a polymeric material having a shore A hardness of at least 75 when cured into a mold to form a rigid tube;

injecting a compliant polymeric material having a shore A hardness in a range of 35 to 45 when cured into a mold to form a tubular inner seal within the rigid tube such that the rigid tube extends axially from one end of the inner seal to another end of the inner seal; and injecting the compliant polymeric material into a mold to form a tubular outer seal around the rigid tube which is separate from the tubular inner seal such that the rigid tube extends axially from one end of the outer seal to another end of the outer seal.

12. The method in accordance with claim 11, wherein the rigid tube extends beyond the ends of the inner seal and the outer seal.

13. The method in accordance with claim 11, wherein the rigid tube is flush with the ends of the inner seal and the outer seal.

14. The method in accordance with claim 11, wherein the polymeric material is selected from a list consisting of polyamide, polybutylene terephthalate, and acrylonitrile butadiene styrene, with or without glass filling.

15. The method in accordance with claim 11, wherein the compliant polymeric material is a silicone rubber material.

* * * * *